United States Patent Office 3,647,909
Patented Mar. 7, 1972

3,647,909
REGENERATION OF CHROMIA-ALUMINA DEHYDROGENATION CATALYST
Glenn O. Michaels, South Holland, Ill., assignor to Atlantic Richfield Company, New York, N.Y.
No Drawing. Filed Feb. 10, 1970, Ser. No. 9,992
Int. Cl. B01j *11/04;* C07c *5/18*
U.S. Cl. 260—683.3      7 Claims

ABSTRACT OF THE DISCLOSURE

An improved method for the dehydrogenation of paraffins and monoolefins, to produce olefin components containing a greater ratio of carbon to hydrogen, in the presence of a chromia-alumina dehydrogenation catalyst is disclosed. The activity and selectivity of the catalyst are maintained by periodically regenerating the catalyst at a temperature above about 1150° or 1200° F., preferably from about 1300° to 1500° F., and at least about 75° F., preferably at least about 100° F., above the average temperature of dehydrogenation. The higher temperatures are achieved by burning of carbonaceous deposits on the catalyst. Coke-formers can be added to the regeneration gas, to increase the regeneration temperature.

---

This invention relates to an improved process for the dehydrogenation of paraffins and monoolefins to form olefin components containing a greater ratio of carbon to hydrogen. More specifically, this invention describes techniques and procedures for improving and maintaining the activity and selectivity of chromia-alumina dehydrogenation catalysts.

Chromia-alumina catalysts have long been used commercially for the dehydrogenation of paraffinic compounds to form monoolefins and/or diolefins and for the dehydrogenation of monoolefins to diolefins. These catalysts generally contain chromia in a minor amount, say of about 1 to 40 weight percent of the catalyst. Quite frequently, dehydrogenation will be carried out with a catalyst containing from about 10 to 20 weight percent chromia on a high surface area, solid support as an activated alumina. Commonly, an alkali metal oxide, such as $Na_2O$, is present in the catalyst in a small amount, for instance, about 0.1 to 4 weight percent, sufficient to counteract acid sites on the catalyst to minimize cracking and isomerization reactions. Normally, an adiabatic, cyclic process is employed in which the hydrocarbon feed is passed over the catalyst for a relatively short period of time such as from about 8 or 10 minutes to about 40 minutes at an elevated temperature of, for example, about 1050° to 1200° F. The conversion reaction is endothermic. The catalyst is then purged free of hydrocarbons, and air is introduced to the reactor system in order to burn off the carbonaceous deposits on the catalyst.

The lost in heat that occurs because of the endothermic heat of reaction during the dehydrogenation process cycle is restored in part by the exothermic heat of combustion of the carbonaceous deposit. By proper control of conditions, a heat balance is obtained by which the average temperature in the bed is maintained more or less constant, although wide swings in the catalyst temperature may occur during various parts of the process-regeneration cycle.

In the dehydrogenation of n-butane, for example, the amount of carbonaceous deposit on the catalyst is sufficiently large enough so that a close approximation to a heat balance can be obtained and usually only small amounts of external heat are required to maintain temperatures. On the other hand, the amount of carbonaceous material deposited on the catalyst in the dehydrogenation of a compound such as isobutane is several times smaller and much less heat is produced during the regeneration cycle.

It has been found in commercial paraffin dehydrogenation units that the activity of the catalyst declines with time during a process cycle, even though the cycle extends for only a few minutes. It has been generally assumed in the past that the decline in activity is due to the deposition of carbonaceous material on the catalyst. The regeneration of the catalyst with air is supposed to restore catalyst activity by burning off the coke in addition to providing heat to the reactor.

A process for the dehydrogenation of $C_2$ to $C_5$ aliphatic hydrocarbons utilizing a chromia-alumina catalyst with catalyst rejuvenation is described in U.S. Pat. 3,180,903. This patent discloses that the rejuvenation can be carried out by heating the catalyst in the presence of air or other free oxygen-containing gas for a period of from about 4 to 40 hours at a temperature of from 1050 to 1500° F., preferably 15 to 30 hours at 1100 to 1300° F. The patent does not actually show any rejuvenations at temperatures other than 1150 to 1160° F. The rejuvenation practice of that patent is disclosed to be essentially static and slow in character, and requires that the processing-regeneration cycle be broken to permit the rejuvenation to be accomplished.

It has been found that merely removing the carbonaceous material deposited on such chromia-alumina dehydrogenation catalysts by conventional procedures is normally not sufficient to restore the maximum activity and selectivity of the catalyst. It has further been found in the present invention that during the regeneration or carbon burn-off cycle the catalyst must be, at least periodically, raised in temperature to a level of above about 1150° or above about 1200° F., preferably from about 1300° to 1500° F., and at least about 75° F., preferably at least about 100° F., above the average dehydrogenation temperature, in a flow of regeneration gas containing a molecular oxygen-containing gas or the catalyst will lose activity on succeeding cycles. This high temperature regeneration results in a higher average reaction temperature during the ensuing dehydrogenation process cycle and, therefore, improved catalyst activity.

The temperature rise during the regeneration cycle is dependent primarily upon the amount of carbonaceous material on the catalyst, the gas flow rate, and the $O_2$ content of the regeneration gas. Thus, for example, if the temperature during regeneration does not reach a given level, the activity of the catalyst will decline, and ensuing hydrocarbon conversion will be lowered (assuming all other conditions remain constant). With lower conversion, the amount of carbonaceous material deposited on the catalyst is lower and the heat rise during the next regeneration cycle will be lower. This, in turn, reduces catalyst activity still further and carbonaceous deposit levels continue to drop. Catalyst activity will drop on each succeeding cycle to a certain minimum activity level at which point a pseudo-equilibrium level is established. Conversely, if the amount of carbonaceous material deposited on the catalyst is increased, for instance, by means such as outlined hereinbelow, the heat rise during regeneration will be increased and the catalyst activity will be increased until a much higher pseudo-equilibrium activity level is established.

In the dehydrogenation of n-butane, for example, carbonaceous deposit levels at normal conversions are usually sufficient to maintain a moderately high activity level. On the other hand, the dehydrogenation of other feedstocks, such as isobutane for example, carbonaceous deposit levels at the same conversion are several times less than with n-butane and regeneration becomes more difficult to conduct at the desired high temperature. When necessary, the high temperature regeneration can be accomplished by the addition to the regeneration zone of an amount of a low molecular weight hydrocarbon sufficient to raise the temperature of regeneration to the desired level, or by the addition to the dehydrogenation feedstock of a coke-former to increase the carbonaceous deposit level on the catalyst.

Thus, the high temperature burning wave to be utilized in regeneration can be obtained by adding a small amount of a low molecular weight hydrocarbon, say of 1 to 3 carbon atoms, to the reactor during the regeneration cycle. It is desirable that these hydrocarbon compounds be inexpensive for economic reasons and also that they do not leave a residue behind after regeneration is accomplished. Examples of such hydrocarbons would be methane, ethane, or the hydrocarbons normally found in natural gas.

It is recognized that materials such as natural gas are frequently added to the regeneration gas stream in such dehydrogenation systems in order to maintain a heat balance in many commercial units. However, normally only enough combustible gas is added to bring the reactor temperature back to the original temperature when the process cycle was started, i.e., about 1050° to 1200° F. One of the features of this invention is that a sufficient amount of a combustible gas can be added to the reactor during the first part of the regeneration to raise temperatures well above the normal operating temperature, i.e., regeneration temperatures above about 1150° or 1200° F., preferably about 1300 to 1500° F., and at least about 75° F., preferably at least about 100° F., above the average temperature of dehydrogenation.

Still another method of obtaining a high temperature burning wave during the catalyst regeneration is to add a hydrocarbon component to the dehydrogenation zone which produces a relatively larger amount of carbonaceous deposit on the catalyst at dehydrogenation conditions that emanates from the feed undergoing dehydrogenation. Example of such materials are normally liquid paraffins and cycloparaffins say of 5 to 10 or more carbon atoms. The additional deposit on the catalyst can provide the desired temperature rise to reactivate the catalyst. These materials need be added only as necessary to maintain catalyst activity. This technique has the advantage that less water of combustion is formed during regeneration than when a hydrocarbon is added to the regeneration gas so that the catalyst returns to a dehydrated state in a shorter time interval. Another important feature in maintaining catalyst activity is that the catalyst should be in as dehydrated a state as economically possible. It is well known that water is a temporary poison for chromia-alumina catalysts, and as such, the presence of water is undesirable.

The feeds dehydrogenated according to the present invention are aliphatic hydrocarbons of 4 or 5 or more carbon atoms. The feeds are usually non-acetylenic and often are saturated or olefinically-unsaturated hydrocarbons or mixtures of saturated and such unsaturated hydrocarbons. The preferred feeds are the normal and branched chain paraffins, including the cyclic paraffins cyclopentane and cyclobutane. The mono-olefinically unsaturated feeds, which can be the $C_4$ and $C_5$ olefins, undergo dehydrogenation to yield dienes.

The frequency of reactivation, the degree of heating and the duration of the reactivation cycle may not be determinable exactly in advance but can be readily established for a given operation. Factors which influence these variables are the age and condition of the catalyst, the type of alumina-chromia catalyst, the feedstock, the normal operating temperature, the amount of coke deposited on the catalyst in a normal run, the amount of inert diluent added to the catalyst bed, etc. It has further been found that the effect of the high temperature regeneration of the present invention can carry over through subsequent cycles such that the high temperature regeneration can be performed periodically with normal regenerations, e.g., to a temperature of about 1150° F., or less, performed in the intervening regenerations. The frequency of the high temperature regeneration can be determined by the activity of the reaction, e.g., conversion of the feedstock. When the percentage of feedstock conversion begins to decrease, the high temperature burning can again be performed during regeneration.

The catalyst bed can be a fixed bed of macrosize catalyst known in the art. Each of the beds generally contains at least about one foot in depth of the catalyst.

The hydrocarbon to be dehydrogenated is contacted under dehydrogenation conditions with the catalyst. The dehydrogenation process is conducted in the vapor phase under an elevated temperature, for instance, about 1050 to 1200° F., preferably about 1100 to 1150° F., and usually a hydrocarbon pressure of up to about 2 atmospheres or more is employed. Generally, increased selectivities are obtained at hydrocarbon pressures below atmospheric, say down to about 0.05 atmosphere or below with a hydrocarbon pressure of about 0.1 to 0.3 atmosphere being preferred for economic reasons. An inert diluent or vacuum can be employed to reduce the hydrocarbon partial pressure of the hydrocarbon feed. Various essentially inert gaseous diluents can be employed but it is preferred to use nitrogen, hydrogen, or methane. The inert gas is usually present in an amount of about 0.5 to 50 moles, preferably about 5 to 25 moles, per mole of hydrocarbon feed. The weight hourly space velocity may vary depending on the temperature and pressure employed, but will generally range from about 0.05 to 5, preferably 0.10 to 2 WHSV. The time of dehydrogenation will generally be about 1 hour or less, preferably 30 minutes or less and usually at least about 5 minutes. The regeneration cycle is usually performed in about 1 hour or less or even 30 minutes or less and usually at least about 5 minutes.

The invention will be illustrated by the following examples.

EXAMPLE I

Fifty grams (50 cc.) of used butane dehydrogenation catalyst (the catalyst had been used in a commercial reactor for 206 days) is diluted with 75 cc. of inert solids and charged to a 1″ universal-type reactor. The catalyst contains about 20 weight percent chromia, balance essentially alumina and also contains a small amount (e.g., about 0.4 weight percent) of sodium oxide. The temperature is raised to 1050° F., while purified dry nitrogen is passed over the catalyst. When temperatures are lined out, a feedstock containing mostly isobutane is passed over the catalyst. The composition of the feed is:

| | Wt. percent |
|---|---|
| Propylene | .03 |
| Propane | 82 |
| Isobutane | 82.6 |
| n-Butane | 16.0 |
| Butenes | .56 |
| Butadiene | .04 |

A total of seven runs is made on the catalyst at approximately 1050° F., 1.1 WHSV and atmospheric pressure, using 30 minute process cycles. The catalyst is regenerated between each run using air for 30 minutes. The maximum temperature of regeneration is approximately that of the conversion, e.g., 1050° F. Data for four of these runs are summarized in Table I, and from the data of Runs 2 and 3 it is seen that the activity of the catalyst had not peaked after 5 minutes of operation.

TABLE I

| Run number | 1 | 2 | | 3 | | 7 |
|---|---|---|---|---|---|---|
| Dehydrogenation conditions: | | | | | | |
| Temperature, °F. (avg.) | 1,061 | 1,063 | 1,063 | 1,050 | 1,050 | 1,050 |
| WHSV | 1.19 | 1.08 | 1.08 | 1.12 | 1.12 | 1.12 |
| LHSV | 21.6 | 1.96 | 1.96 | 2.04 | 2.04 | 2.04 |
| Pressure | Atmos. | Atmos. | Atmos. | Atmos. | Atmos. | Atmos. |
| Length of run (min.) | [1] 0-30 | [1] 5 | [1] 25 | [1] 5 | [1] 25 | [1] 25 |
| Cycle No.[2] | 1 | 2 | 2 | 3 | 3 | 7 |
| Products, wt. percent on feed: | | | | | | |
| $C_2+C_2=$ | .34 | .41 | .38 | .36 | .27 | .33 |
| $C_3=$ | .90 | .86 | .91 | .82 | .93 | .99 |
| $C_3$ | .96 | 1.37 | 1.02 | .98 | .87 | .99 |
| $iC_4$ | 60.16 | 69.91 | 59.17 | 64.43 | 57.41 | 58.69 |
| $nC_4$ | 10.82 | 11.16 | 10.76 | 11.98 | 10.66 | 10.97 |
| $iC_4=$ (plus $C_4=-1$) | 23.33 | 18.51 | 24.21 | 18.69 | 26.24 | 24.41 |
| $C_4=$-trans | 1.74 | 1.47 | 1.83 | 1.44 | 1.91 | 1.81 |
| $C_4=$-cis | 1.35 | 1.01 | 1.29 | 1.03 | 1.37 | 1.48 |
| Butadiene | .39 | .30 | .43 | .26 | .33 | .33 |
| Coke | .29 | .28 | .28 | .14 | .14 | .25 |
| Conversion of $iC_4$, wt. percent | 27.1 | 21.4 | 28.3 | 22.0 | 3.05 | 28.9 |
| Yield of $iC_4=$, mole percent per pass | 23.3 | 18.5 | 24.2 | 18.7 | 26.2 | 24.4 |

[1] Gas chromatography samples taken at time indicated.
[2] Indicates number of cycles before analytical samples were taken.

EXAMPLE II

The same catalyst as in Example I is heated during regeneration to 1200° F. for one hour in flowing air (80 s.c.f. of air/lb. of catalyst). The temperature is then lowered to approximately 1050° F. and an additional seven dehydrogenation-regeneration (at 1050° F.) cycles are run using the catalyst at about the same conditions as in Example I. The data from two of these runs are shown in Table II. As can be seen from a comparison of Table II with Table I, the average product yield increased with the higher temperature and longer time of regeneration. Similar results can also be obtained by regeneration at 1400° F. for 25 minutes.

TABLE II

| Run number | 8 | | 9 | |
|---|---|---|---|---|
| Dehydrogenation conditions: | | | | |
| Temperature, °F. (avg.) | 1,047 | 1,047 | 1,047 | 1,047 |
| WHSV | 1.03 | 1.03 | 1.03 | 1.03 |
| LHSV | 1.88 | 1.88 | 1.88 | 1.88 |
| Pressure | Atmos. | Atmos. | Atmos. | Atmos. |
| Length of run (min.) | [1] 5 | [1] 25 | [1] 5 | [1] 25 |
| Cycle No.[2] | 1 | 1 | 7 | 7 |
| Products, wt. percent on feed: | | | | |
| $C_2+C_2=$ | .40 | .34 | .46 | .38 |
| $C_3=$ | .80 | 1.13 | 86 | .97 |
| $C_3$ | .95 | .85 | 1.32 | .91 |
| $iC_4$ | 62.74 | 52.51 | 63.07 | 54.21 |
| $nC_4$ | 11.42 | 9.60 | 11.19 | 10.20 |
| $iC_4=$ (plus $C_4=-1$) | 20.83 | 31.62 | 20.09 | 29.25 |
| $C_4=$-trans | 1.41 | 2.03 | 1.48 | 2.09 |
| $C_4=$-cis | 1.10 | 1.58 | 1.17 | 1.61 |
| Butadiene | .35 | .34 | .36 | .38 |
| Coke | .17 | .17 | .25 | .25 |
| Conversion of $iC_4$, wt. percent | 24.0 | 36.4 | 23.6 | 34.3 |
| Yield of $iC_4=$, mole percent per pass | 20.8 | 31.6 | 23.6 | 34.3 |

[1] Gas chromatography samples taken at time indicated.
[2] Indicates number of cycles before analytical samples were taken.

EXAMPLE III

During cycle No. 366, ¼ cc. of methyl cyclopentane is added slowly to the feed line during the dehydrogenation process period and an additional two dehydrogenation-regeneration cycles are run. Analysis of the run of cycle No. 38 is shown in Table IV, below. A large percentage of the methyl cyclopentane is converted to coke on the catalyst as evidenced by the large amount of $CO_2$ that is collected when the catalyst is treated with air, and by the fact that temperatures rise by about 100 to 150°, e.g., to a level of from about 1150 to 1200° F., during the regeneration period. No methyl cyclopentane is added in subsequent cycles. As shown in the table below, the higher temperature during regeneration increases the activity of the catalyst, and this effect of the high temperature burning carries over through subsequent regenerations, e.g., that the high temperature burning need not be performed with every regeneration. Regeneration between the high temperature regeneration can be performed by conventional procedures, as set forth above.

TABLE IV

| Run number | 38 | |
|---|---|---|
| Dehydrogenation conditions: | | |
| Temperature, °F. | 1,058 | 1,058 |
| WHSV | 1.06 | 1.06 |
| LHSV | 1.92 | 1.92 |
| Pressure | Atmospheric | |
| Length of run (min.) | [1] 5 | [1] 25 |
| Products, wt. percent on feed: | | |
| $C_2$ $C_2=$ | .71 | .70 |
| $C_3=$ | 1.28 | 1.96 |
| $C_3$ | 1.06 | .98 |
| $i-C_4$ | 48.88 | 43.31 |
| $n-C_4$ | 9.39 | 8.21 |
| $i-C_4=(+C_4=-1)$ | 34.71 | 40.17 |
| $C_4=$-trans | 2.05 | 2.58 |
| $C_4=$-cis | 1.70 | 1.82 |
| Butadiene | .21 | .28 |
| Conversion of $i-C_4$, wt. percent | 40.8 | 47.5 |
| Yield of $i-C_4=$, mole percent per pass | 34.7 | 40.2 |

[1] Gas chromatography samples taken at time indicated.

EXAMPLE IV

A separate sample (50.0 grams) of the catalyst of Example I is charged to a 1" universal-type reactor in the same manner as in Example I. The catalyst temperature is raised to 1050° F. without purging. Twenty-five dehydrogenation-regeneration cycles are made with the catalyst at 1050° F. as in Example I. After the twenty-fifth cycle the temperature of dehydrogenation and regeneration is raised to 1150° F. and an additional seven cycles are conducted in order to allow the catalyst and conditions to reach equilibrium. At the end of the seventh cycle, ¼ cc. of acetone is injected into the air regeneration stream. The temperature immediately rises by about 100 to 150°, e.g., to a level of from about 1150° to 1250 to 1300 ° F. Additional runs are made at the same conditions before the acetone was added. Data on some of the runs are summarized below in Table II. Product yield has again dramatically increased.

TABLE VII

| | | Dehydrogenation conditions | | | |
|---|---|---|---|---|---|
| Cycle number | Remarks | Temp., °F. | WHSV | Length of run, min. | Conversion of $iC_4$, wt. percent |
| 31 | Duplicate runs | 1,152 | 1.01 | 30 | 42.6 |
| 32 | | 1,152 | 1.01 | 30 | 41.7 |
| | ¼ cc. acetone added to the air regeneration stream after cycle No. 32. | | | | |
| 35 | | 1,152 | 1.01 | 30 | 52.7 |
| 40 | | 1,152 | 1.01 | 30 | 57.2 |

The high temperature burning wave caused by the injection of acetone increases the activity of the catalyst as indicated by the rise in conversion from approximately 42% to 53–57%.

It is claimed:

1. In the process for dehydrogenating paraffin and monoolefin feedstocks containing 4 to 5 carbon atoms to form olefin components having a greater ratio of carbon to hydrogen using a chromia-alumina catalyst disposed as a fixed bed in a reactor wherein the dehydrogenation is cyclically interrupted to regenerate the catalyst while disposed as said fixed bed, the improvement which comprises regenerating the catalyst by contacting said fixed bed of catalyst with low molecular weight hydrocarbon and oxygen-containing gas to obtain a burning wave in the catalyst bed during the first part of the regeneration to burn carbonaceous deposits from the catalyst at a temperature of at least about 1200° F., and at least about 75° F., higher than the average temperature of said dehydrogenation, said contacting being for about five minutes to one hour.

2. The improvement of claim 1 wherein the low molecular weight hydrocarbon is methane.

3. In the process of claim 1 wherein the catalyst is periodically regenerated at a temperature of from about 1300° to 1500° F., and at least about 100° F. higher than the average temperature of dehydrogenation for about 5 to 30 minutes.

4. In the improvement of claim 1 wherein a coke-forming material is added to the feedstock in an amount sufficient to increase the amount of coke deposited on the catalyst during dehydrogenation, said coke-forming material producing a larger amount of carbonaceous deposit on the catalyst than said feedstock.

5. In the improvement of claim 3 wherein the low molecular weight hydrocarbon contains from about 1 to 3 carbon atoms.

6. In the improvement of claim 4 wherein the coke-forming material is selected from the group consisting of paraffins and alkyl cycloparaffins containing 5 to 10 carbon atoms.

7. The improvement of claim 5 wherein the low molecular weight hydrocarbon is methane.

References Cited

UNITED STATES PATENTS

| | | | |
|---|---|---|---|
| 3,180,903 | 4/1965 | Lindquist et al. | 260—683.3 |
| 3,050,469 | 8/1962 | Morgan et al. | 260—683.3 |

DELBERTE E. GANTZ, Primary Examiner

V. O'KEEFE, Assistant Examiner

U.S. Cl. X.R.

252—416